United States Patent
De Cremoux

(10) Patent No.: US 8,232,787 B2
(45) Date of Patent: Jul. 31, 2012

(54) PULSE TIME DETECTOR, A CONTROLLER FOR A SWITCHED MODE POWER SUPPLY, AND A SWITCHED MODE POWER SUPPLY INCLUDING SUCH A CONTROLLER

(75) Inventor: Guillaume De Cremoux, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 557 days.

(21) Appl. No.: 12/431,539

(22) Filed: Apr. 28, 2009

(65) Prior Publication Data
US 2010/0270988 A1    Oct. 28, 2010

(51) Int. Cl.
*G05F 1/40* (2006.01)
*G05F 1/613* (2006.01)

(52) U.S. Cl. .......................... 323/284; 323/225

(58) Field of Classification Search .................. 323/222, 323/225, 259, 282–285, 351
See application file for complete search history.

(56) References Cited

U.S. PATENT DOCUMENTS

| | | | |
|---|---|---|---|
| 6,696,821 B2 * | 2/2004 | Haraguchi et al. | 323/222 |
| 7,768,245 B1 * | 8/2010 | De Cremoux | 323/259 |
| 7,994,762 B2 * | 8/2011 | de Cremoux et al. | 323/271 |
| 2009/0146623 A1 | 6/2009 | De Cremoux et al. | |

* cited by examiner

*Primary Examiner* — Jessica Han
(74) *Attorney, Agent, or Firm* — Koppel, Patrick, Heybl & Philpott

(57) ABSTRACT

An apparatus for monitoring the pulse time of switches within a DC to DC power supply, comprising a timing circuit responsive to a switching confirmation signal to commence timing and to monitor for control signals being sent to the switch and to indicate whether elapsed period between the switching confirmation signal and the control signal is too long or too short.

14 Claims, 7 Drawing Sheets

PULSE TIME DETECTOR, A CONTROLLER FOR A SWITCHED MODE POWER SUPPLY, AND A SWITCHED MODE POWER SUPPLY INCLUDING SUCH A CONTROLLER

FIELD OF THE INVENTION

The present invention relates to a pulse time detector for monitoring pulse times in a switched mode power supply, to a controller for a switched mode power supply including such a detector, and to a switched mode power supply controlled by the controller.

BACKGROUND OF THE INVENTION

It is well known that DC to DC converters can be made to step down, that is BUCK, or step up, that is BOOST, a DC input voltage to a different DC output voltage. The DC to DC converter may comprise an inductor in association with two or more transistors such that the current in the inductor can be built up such that energy is stored in it by virtue of its magnetic field, and then that energy can be discharged from the inductor in order to charge a storage capacitor at the output of the DC to DC converter.

Where a DC to DC converter operates with, for example, a battery as the input voltage source then the battery voltage may change as the battery discharges. Thus a converter may initially be required to BUCK the input voltage, but as the battery discharges it may move into a BOOST mode. It follows that at some time the input voltage may be close to the output voltage. This regime can be difficult to control.

It should be noted that such inductor based DC to DC converters inherently require a ripple current to occur in the inductor otherwise the converter loses its ability to regulate its output voltage in response to changes of load current. It becomes important to be able to control this ripple.

SUMMARY OF THE INVENTION

According to a first aspect of the present invention there is provided an apparatus for monitoring a pulse time of one or more switches within a DC to DC power supply mode, comprising a timing circuit responsive to a switching confirmation signal to commence timing and to monitor for control signals being sent to the one or more switches and to indicate whether an elapsed period between the switching confirmation signal and the control signal is too long or too short.

It is thus possible to commerce the timing of all time periods from a single event. This avoids the build-up of excessive cumulative delays due to "guard periods" where one timing period is triggered by the expiration of a preceding period. This has a significant benefit. The uncertainty in device performance, eg. propagation delays and switching or decision times in components resulting from process variations during manufacture and/or changes in temperature and/or voltage supply, mean that it is common to build a "guard time" into time windows to account for the difference between the fastest and the slowest device of a batch of devices, or of devices that fall with an acceptable device specification. By triggering time windows in sequence, where the commencement of one window depends on the completion of a previous window, then the guard times become summed and consequently the aggregated guard time becomes unnecessarily long. For a device working in a cyclical manner, the unnecessarily long guard time reduces the operating frequency (or if you prefer lengthens the cycle time) beyond that necessary for satisfactory operation of the device.

The limit on operating frequency that the summed guard times impose may limit device performance.

According to a second aspect of the invention there is provided a controller for a DC to DC converter including an apparatus for monitoring pulse time according to the first aspect of the invention.

Preferably the controller is arranged to cause an offset to be generated and applied to signals or comparators in signal paths used to control first and second switches of the DC to DC converter. The first switch controls current flow from an input to a first node of the inductor, and the second switch controls current flow between the second node of the inductor and a common conductor, which acts as a local ground.

According to a third aspect of the present invention there is provided a method of monitoring pulse times of at least one switch within a DC to DC power supply, comprising the steps of:
a) monitoring for receipt of a switching confirmation signal which confirms that a switch has reached a desired switching state;
b) starting at least one timer in response to the switching confirmation signal;
c) monitoring for receipt of a control signal to revert the switch from the desired state;
d) comparing an elapsed time as measured by the timer with threshold values and indicating whether the time period from the switching confirmation signal to receipt of the control signal was too long or too short.

Advantageously the DC to DC power supply has first and second switches, the first switch in series between an input node and a first terminal of the inductor and the second switch located between a second terminal of the inductor and a local ground, and the method is responsive to control signals for each of the first and second switches.

BRIEF DESCRIPTION OF THE DRAWINGS

The present invention will further be described, by way of example only, with reference to the accompanying drawings, in which.

DESCRIPTION OF PREFERRED EMBODIMENTS OF THE INVENTION

Figure 1:
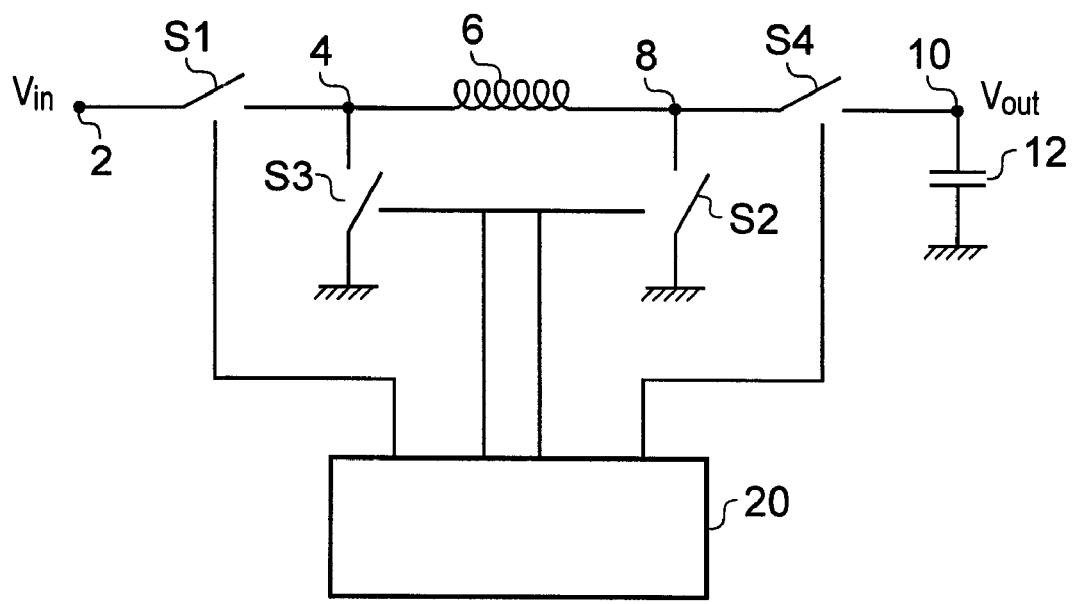
FIG. 1 schematically illustrates a DC to DC converter.

A DC to DC voltage converter operable to increase, i.e. BOOST, an input voltage $V_{in}$ or to reduce, i.e. BUCK, an input voltage $V_{in}$ is shown in FIG. 1.

The converter comprises an input node 2 which is connected to a first terminal 4 of an inductor 6 via a first electrically controlled switch 51. A second switch S2 extends between a second terminal 8 of the inductor 6 and ground (which may be a "local ground"). A third electrically controlled switch S3 extends between the first terminal 4 of the inductor 6 and ground. A fourth switch S4 extends between the second terminal 8 of the inductor 6 and an output node 10. A filtering capacitor 12 is connected between the output node 10 and ground. The switches S3 and S4 provide commutation paths and act as active rectifiers. They can be replaced by diodes if desired, and it is advantageous to have diodes placed in parallel with S3 and S4.

Only one "ground" is shown but sometimes a designer may choose to implement several "grounds" by virtue of using different conductors to provide the grounds. This allows one ground to be used for switching currents, for example as flow through S2 and S3, whilst other grounds are used for quieter lines, such as control signals, so as to reduce cross talk resulting from variations in the ground voltage due to current flow in the conductors acting as a ground.

The switches are driven by a controller 20 which provides control signals to the switches.

The basic operation of the converter circuit is well known, but will be briefly described for completeness.

Buck Converter Mode

In this mode $V_{in}$ is greater than $V_{out}$. The controller acts to generate a desired output voltage $V_{out}$ from the input voltage $V_{in}$. This can be achieved by selectively controlling the states of switches S1 and S3. In this mode S2 is kept permanently open (high impedance) and S4 is kept closed (low impedance).

Switches S1 and S3 are driven in anti-phase. This ensures that both switches are not simultaneously conducting which would cause the input voltage $V_{in}$ to short circuit to ground.

In a first phase, which can be regarded as a magnetisation phase, S1 is closed and S3 is open. Therefore the voltage across the coil, Vcoil, is $$Vcoil = V_{in} - V_{out} \quad \text{Equation 1}$$

and the rate of change of current, and more particularly of current build up is given from $$\frac{dI}{dt} = \frac{(V_{in} - V_{out})}{L} \quad \text{Equation 2}$$

Figure 2:
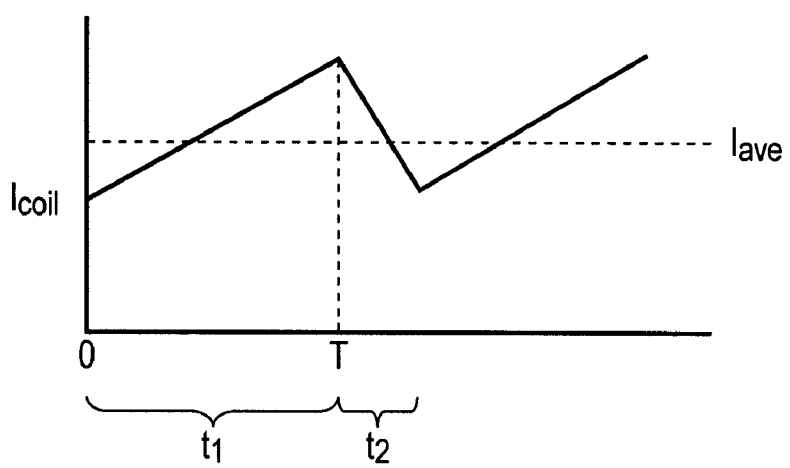
FIG. 2 shows the evolution of inductor current as a function of time for the circuit of FIG. 1 when operating to BUCK (reduce) an input voltage to a lower value.

This current flows for a first time period $t_1$ as shown in FIG. 2, towards the output node 10 where some of the current is supplied to a load and some of the current charges the capacitor 12 such that a small increase occurs in the voltage $V_{out}$ across the capacitor.

The controller 20 monitors the output voltage $V_{out}$ and a regulation loop within the controller causes switch S1 to open and switch S3 to close.

This causes the voltage across the inductor to become $$Vcoil = 0 - V_{out} = -V_{out} \quad \text{Equation 3}$$

Consequently the rate of change of current flow in the inductor 6 becomes $$\frac{dI}{dt} = \frac{-V_{out}}{L} \quad \text{Equation 4}$$

Thus, in a second period the current flow in the coil 6 starts to decrease, as shown in period t2. Meanwhile current is being drawn from the load so the voltage $V_{out}$ may fall a little. This process, which can be regarded as a switching cycle or a control cycle, is repeated by the controller, typically at a repetition rate of 500,000 to 3,000,000 times per second. These values are for illustration only and are not limits. This provides very fine control of the input voltage and the voltage ripple thereon.

It can be seen in FIG. 2 that the instantaneous current varies around an average value $I_{ave}$ which represents the average current being drawn by the load—and assumed for simplicity to be constant over the two switching cycles shown in FIG. 2.

Boost Mode

When it is desired to make $V_{out}$ greater than $V_{in}$, then the circuit can be operated in a BOOST mode.

In this mode switch S1 is left closed (low impedance) and S3 is left open (high impedance). Switches S2 and S4 are operated in anti-phase.

During a magnetisation phase S4 is opened and S2 is closed. Therefore the voltage across the coil is given by $$Vcoil = V_{in} - 0 = V_{in} \quad \text{Equation 5}$$

and consequently the rate of change of current in the coil is given by $$\frac{dI}{dt} = \frac{V_{in}}{L} \quad \text{Equation 6}$$

so the current builds relatively rapidly. After a time period $t_3$, shown in FIG. 3, the controller 20 opens switch S2 and simultaneously closes switch S4.

Current from the coil now flows towards the load and into the output capacitor 12, thereby charging it, as the magnetic flux around the coil collapses.

During this phase the voltage across the coil is $$Vcoil = V_{in} - V_{out} \quad \text{Equation 7}$$

and $$\frac{dI}{dt} = \frac{-V_{in} + V_{out}}{L} \quad \text{Equation 8}$$

Figure 3:
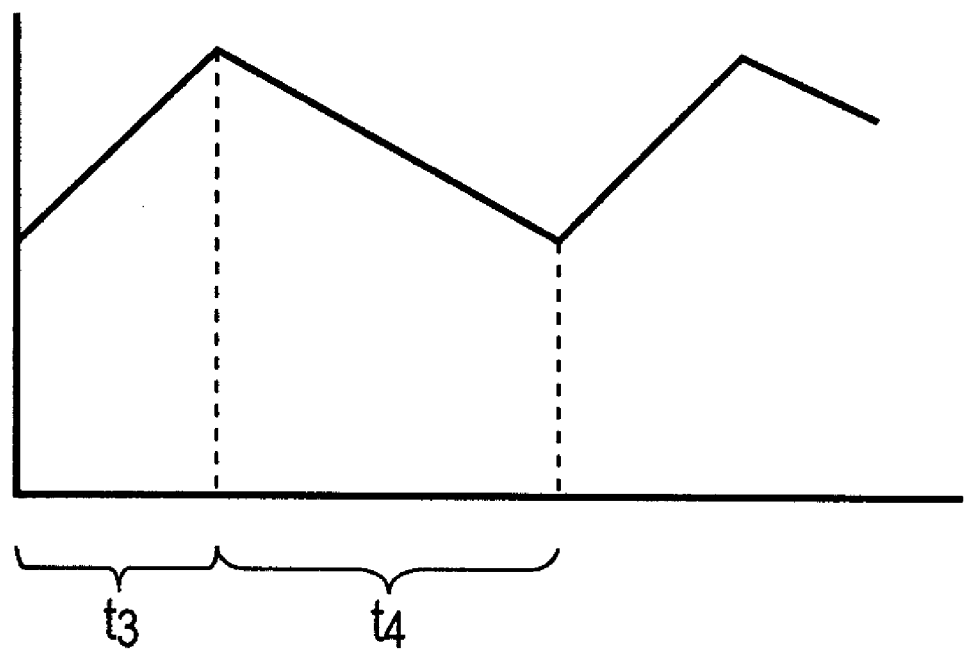
FIG. 3 shows the evolution of inductor current as a function of time for the circuit of FIG. 1 when operating to BOOST the input voltage to a higher output voltage.

This can be considered as a demagnetisation phase, and is designated $t_4$ in FIG. 3.

Without going into rigorous analysis, it can be shown that if a duty cycle D represents the proportion of the time that switch S1 is conducting then, for the BUCK converter $$V_{out} = V_{in} \cdot D \quad \text{Equation 9}$$

If the duty cycle represents the proportion of time that the switch S2 is conducting, then for the BOOST converter $$V_{out} = \frac{V_{in}}{1 - D} \quad \text{Equation 10}$$

These BUCK and BOOST converters work very well when the difference between $V_{in}$ and $V_{out}$ is relatively large.

The operation of the controller 20 can be quite simple if the converter is always going to be in BUCK mode or always going to be in BOOST mode.

Figure 4:
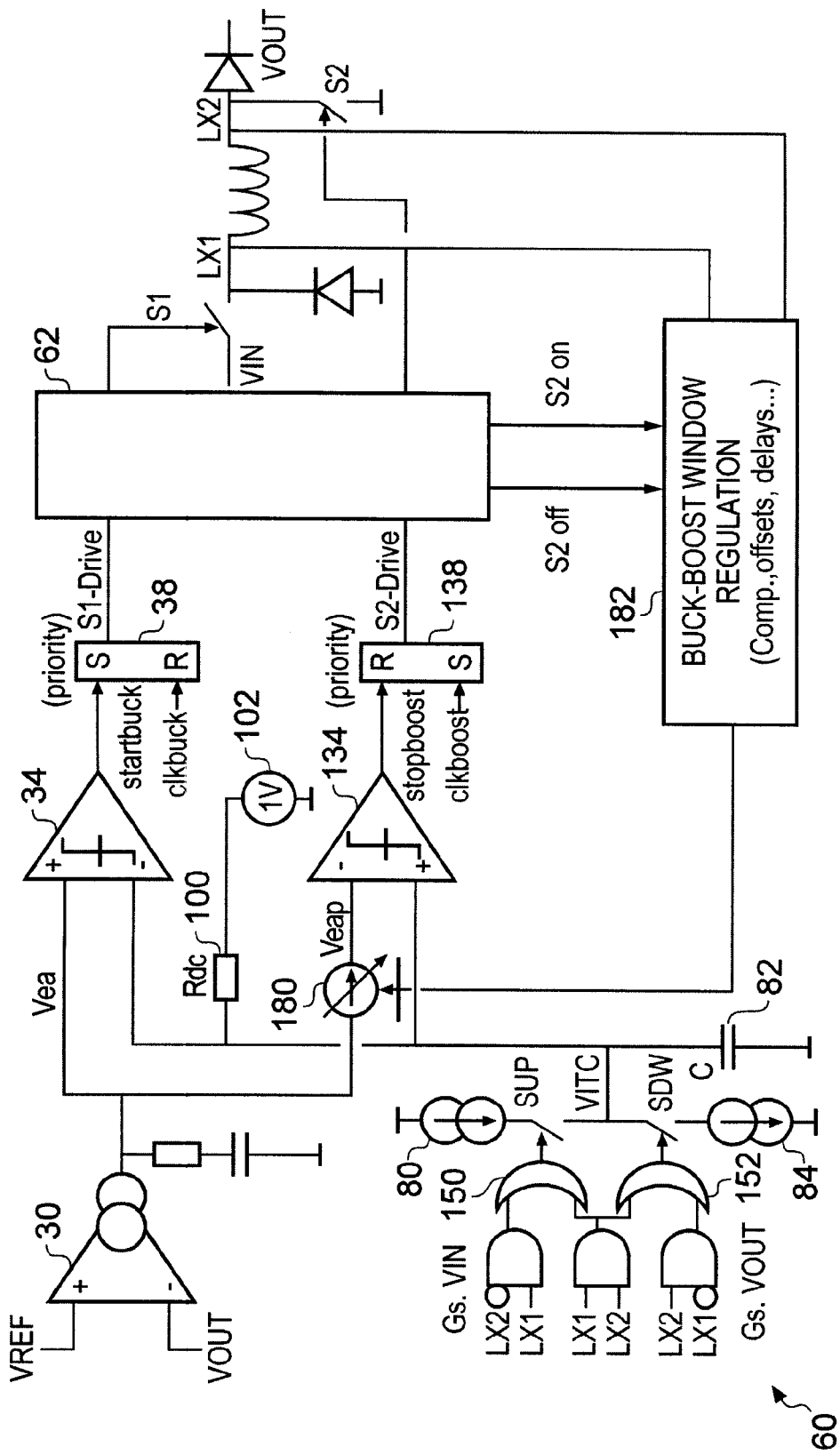
FIG. 4 shows a controller suitable for use in BOOST or BUCK or BUCK-BOOST operation and constituting an embodiment of the invention.

A controller operable in both BUCK and BOOST mode is shown in FIG. 4. Such a controller comprises voltage error amplifier 30 which receives the output voltage (optionally via a resistive attenuator not shown) at one input of the amplifier with a reference voltage supplied to the other input of the amplifier. In this example the reference voltage is provided to the non-inverting input, but the person skilled in the art could design equivalent circuits where this was not the case. The amplifier 30 forms an output Vea which is a function of the difference between the output voltage and the reference voltage, as modified by a gain $G_1$ of the amplifier 30.

The output of the amplifier 30 is supplied to an input of a comparator 34 in a circuit which can be regarded as a BUCK circuit of the converter. A further input of the comparator is often provided with a signal which, in this example, is from a current sensing circuit that senses the current in the inductor coil. This could be done by, for example a hall effect sensor, but is often performed by measuring the voltage dropped across an ohmic impedance in series with the inductor coil, or by measuring the voltage dropped across transistor S1. However, in this example the coil current is not directly measured but is instead estimated by a coil current emulator 60 which is the subject of a co-pending patent application and will be described later. The output of the comparator 34 is provided to a reset input of a set-reset latch 38.

An output of the set-reset latch 38 forms the "S1-drive" signal used to control S1 to cause current to be built in the inductor.

A clock signal (i.e. a periodic signal) from a clock circuit (not shown, but known to the person skilled in the art) initiates the start of each control cycle within the controller 20. The clock circuit generates a short pulse "clkbuck" at periodic intervals and which is provided to the reset input of the set-reset latch 38. This causes the signal "S1-drive" to be removed, and hence the transistor switch S1 becomes non-conducting.

The estimated or sensed coil current is compared with the voltage error signal Vea by comparator 34, and once the current (as converted to a voltage $V_{ITC}$) becomes less than Vea then the comparator output is asserted, and this sets the set-reset latch causing the "S1-drive" signal to asserted, and coil in the inductor to increase.

It can be seen that this circuit as described so far is operable as a BUCK converter.

A BOOST section is also provided. It can be seen that the boost section has a second comparator 134 analogous to comparator 34. The second comparator receives the output $V_{ITC}$ representing the instantaneous current in the inductor 6 at one input thereof, and a version of the error voltage Veap, subject to possible offsetting at another input thereof. An output of the comparator 134 is provided to a reset terminal of a set-reset latch 138. An output of the latch is used to drive the second switch S2 and S4 as the compliment of the drive to S2. The set terminal of the latch 138 receives a BOOST clock signal, "clkboost". Thus the occurrence of the clkboost signal causes latch 138 to be set thereby giving rise to a signal S2-drive to close switch S2. Once the inductor current (as represented by $V_{ITC}$) exceeds Veap the comparator resets latch 138 thereby inhibiting S2-drive.

clkbuck and clkboost have the same frequency as each other.

The switch control signals can be used to directly drive the switches directly if only S1 and S2 are present. However when switches S3 and S4 (of FIG. 1) are also provided then as shown here the switch control signals from the latches 38 and 138 are used as inputs to a switch control state machine 62 that controls the electronic switches. The state machine may set one or more flags, as represented by output 64, to indicate the state of each of the switches S1 and S4.

However, and as noted before, the operation of the converter can become compromised when the difference between $V_{out}$ and $V_{in}$ starts to fall.

This can be seen because each converter relies on there being a change in the current flowing through the coil during the control cycle. But if $V_{in}$ and $V_{out}$ are nearly equal then the rate of increase of current in the magnetisation phase of, for example, the BUCK converter $$\frac{dI}{dt} = \frac{(V_{in} - V_{out})}{L} \qquad \text{Equation 11}$$

and the rate of decrease in the demagnetisation phase of the BOOST converter $$\frac{dI}{dt} = \frac{V_{out} - V_{in}}{L} \qquad \text{Equation 12}$$

both tend to zero.

A way to overcome the problem of $V_{in}$ being similar to $V_{out}$ is to deliberately induce a current ripple. This is done in a "buck-boost" window where switches S1 and S2 are made conducing in each control cycle.

In such a regime each control cycle has several phases.

Figure 5:
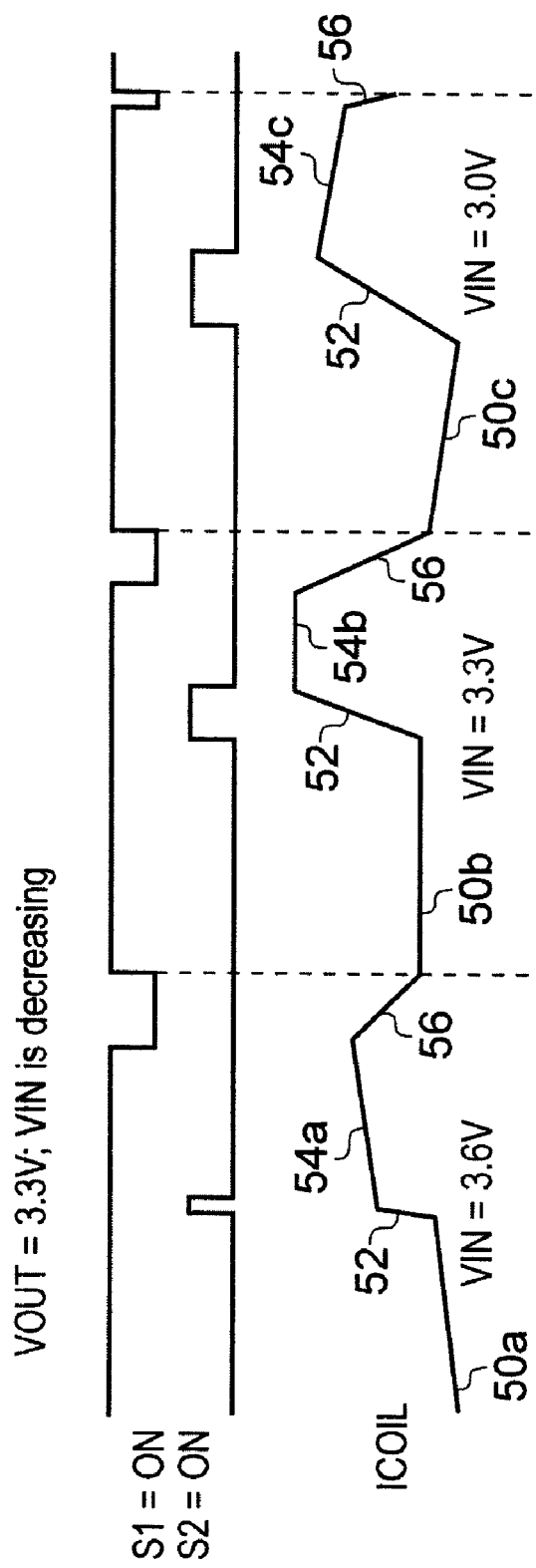
FIG. 5 shows exemplary switch control signals as an input voltage drops.

FIG. 5 shows the switching events in a converter operating in a BUCK-BOOST mode as the input voltage drops from 3.6 V to 3.3 V and then to 3 V, whilst $V_{out}$ is 3.3 V.

It can be seen that each of the cycles has a slow current change region 50*a* to 50*c*. Here switch S3 is not conducting, S1 is conducting, switch S4 is conducting and S2 is not conducting. Thus the voltage across the inductor is $V_{in}$-$V_{out}$. Consequently at 50*a* the current builds slowly, at 50*b* there is no change in current and at 50*c* the current actually reduces slowly.

Each cycle also has a period 52 of fast current build when S1 and S2 are both conducting, and S3 and S4 are off. Once the current has built to a sufficient level as determined by the controller 20 then, S2 is opened again (made non-conducting) giving rise to slow current change in regions 54*a* to 54*c*.

Finally a discharge phase occurs when S1 is off and S2 is off, so S3 and S4 are on, as indicated by region 56.

Because the controller 20 is responsive to the coil current and the output voltage, then the duration for which S1 is off and for which S2 is on varies. Thus when $V_{in}$ is greater than $V_{out}$ the time for which switch S2 is on is short (and ultimately is zero for pure BUCK operation). As $V_{in}$ transitions from a bit above $V_{out}$ to a bit less than $V_{out}$ it can be observed that the off time for S1 decreases and the on time for S2 increases.

If the input voltage falls further then switch S1 becomes permanently on and we enter pure BOOST operation.

It should be noted that were a BUCK-BOOST controller includes two separate control paths (i.e. a BUCK section and a BOOST section) that can operate concurrently for a given range of input voltage, $V_{in}$, then the paths can have their overlap of operation varied by introducing an offset between the paths. The offset can be introduced in any suitable form, i.e. a voltage, a current, a time offset between clock pulses or a digital offset. The present invention can be applied to any control system which varies relative performance of each channel via a varying offset.

However it is necessary to control the relative timing and duration that the switches are on if excessive currents are not to flow in the inductor or regulation is not to be lost. Control strategies divide into 1) voltage mode control
2) current mode control An example of current mode control is given in U.S. Ser. No. 12/001,700. Here a measurement of the coil current is made. The peak coil current is measured and converted to a sensing voltage $V_{cur}$. This is then compared with the voltage error signal. This approach removes one of the 0 Hz poles which would occur in the control loop is a voltage mode control is adapted.

However measuring the current is not trivial. Often the inductor current IL is extracted by measuring the voltage dropped across the first switch S1, which is typically a FET.

This requires the FET to be conducting, and any voltage bounce/ripple to have died away. This typically requires a measurement guard time to be introduced.

Thus, current measurement problems are introduced, but control loop stability is improved.

There are however, further undesirable real world component effects that need to be accounted for, and which can introduce time delays into the control loop, and hence further compromise operation
1) the comparators do not switch instantly, and may exhibit significant delays.
2) The time to turn the switches on and off varies with temperature and can run into 10's of nanoseconds.

Returning to FIG. 4, an emulator 60 may take the place of a current sensor. The emulator receives as its input a signal LX1 representing the voltage at the first node of the inductor. The signal LX1 can, as shown, be measured at the first node of the inductor, or it can be inferred from knowledge of the supply voltage $V_{in}$ and knowledge of the state of the first switch S1 (from the state machine 62) associated with the first node of the inductor and which, in conjunction with switch S3, controls whether the first node of the inductor is connected to $V_{in}$ (e.g. the first voltage) or to ground (the reference voltage). Indeed, if the supply voltage is quite stable then the emulator 60 could be solely responsive to the switch control state machine 62.

The emulator 60, by forming an idealised estimate of the instantaneous current in the inductor, removes the noise associated with trying to form an instantaneous measurement.

The emulator 60 can also change the transfer function of the control loop.

The emulator can be fabricated in many ways, and can be fabricated so as to work in the analog domain or the digital domain—for example as on up/down counter.

The emulator 60 comprises a current source which generates a current $I_{charge}$ proportional to the input voltage $V_{in}$ $$I_{charge}=G_s \cdot V_{in}$$

where $G_s$ represents a transconductance term.

The current $I_{charge}$ is selectively supplied to a capacitor 82 when the signal LX indicates that switch S1 has closed.

When S1 is closed, the rate of current charge in the inductor is $$\frac{dI}{dT}=\frac{(V_{in}-V_{out})}{L}$$

The current source 80 models the term $$\frac{V_{in}}{L}.$$

To model the term $$\frac{-V_{out}}{L}$$

a current sink 84 is provided to pass a current $I_{discharge}$ where $$I_{discharge}=G_s \cdot V_{out}$$

The current flow to the current sink is controlled by a switch responsive to LX2 (and optionally LX1, as shown in FIG. 4).

Also, as shown in FIG. 4, it is desirable to constrain the voltage across the capacitor to ensure it always takes sensible values. To this end, a leakage path via resistor 100 to a voltage source 102 is provided, so as to urge the voltage across the capacitor 82 towards the voltage of the voltage source 102. This compensates for drift that may occur in the scaling of the current source and sink or as a result of errors in measuring $V_{in}$ or $V_{out}$.

The arrangement of FIG. 4 also includes a variable offset generator 180 responsive to an offset control circuit 182. In this embodiment the offset generator 180 is inserted in the signal path to the inverting input of comparator 134. The skilled person will appreciate that an equivalent offset could be applied in the signal path to the non-inverting input or that current steering within the comparator (which typically has a long tail pair) could be implemented to introduce a bias into the long tail pair so as to give a controllable offset in the comparator's response. Alternatively, as disclosed in U.S. Ser. No. 12/001,700 an offset can be introduced into the signal paths to both comparators.

Figure 6:
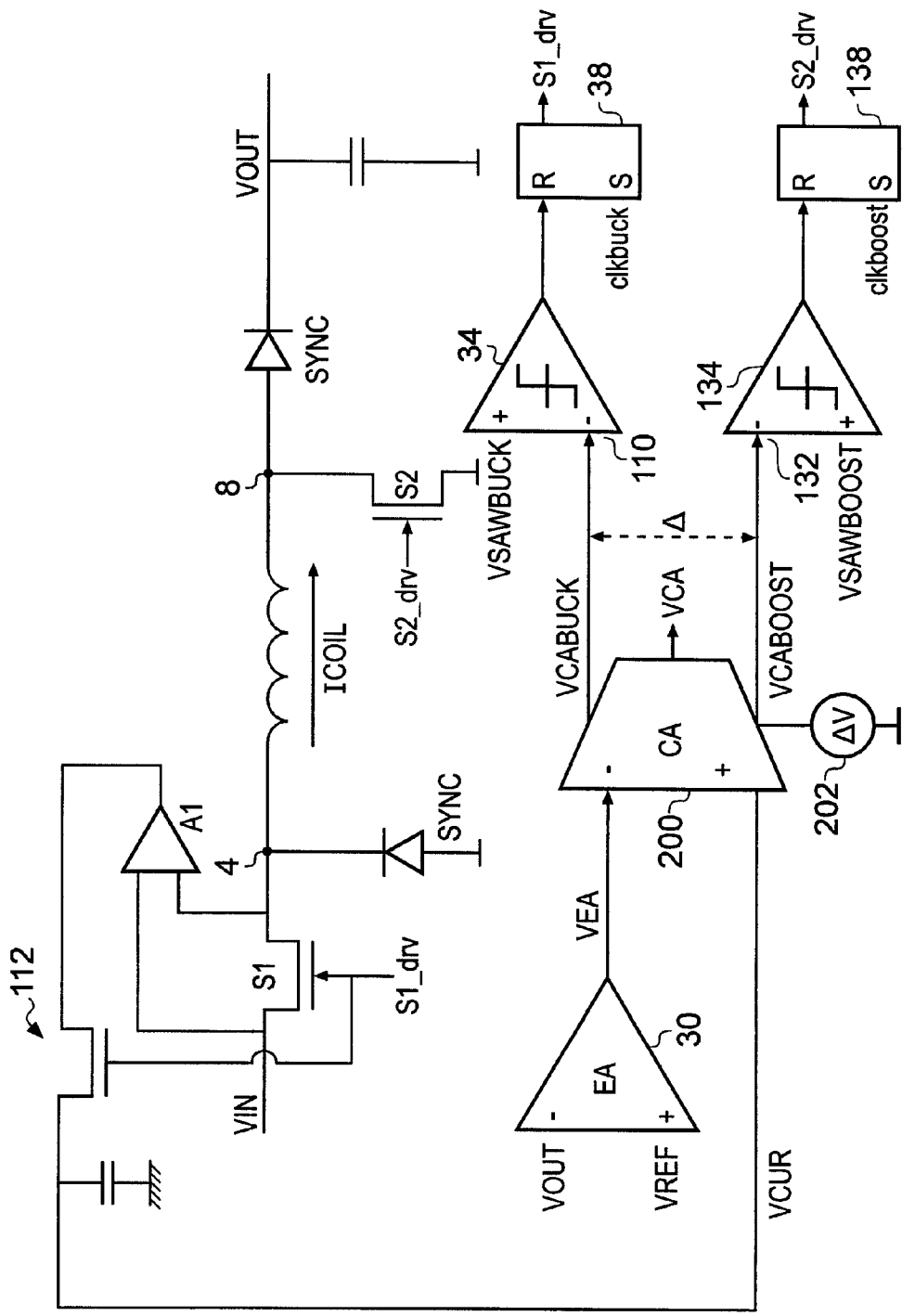
FIG. 6 shows a controller and DC to DC converter suitable for use in BUCK or BOOST operational and constituting a further embodiment of the invention.

Other controller configurations are possible. FIG. 6, which is taken from U.S. Ser. No. 12/001,700 shows a circuit where signal path between the amplifier 30 and the comparators 34 and 134 is interrupted by an offset amplifier that produces two versions of Vea labelled VCABUCK and VCABOOST which are centred about Vea and separated by a voltage ΔV generated by a voltage generator 202, which is responsive to an offset control circuit, like item 182 of FIG. 4.

It also shows a current measuring circuit, designated 112 whose operation is known by the person skilled in the art.

This offset provided by offset generator 180 or 202 is used to correct for the effects of delay in the comparator switching times (which may be asymmetric) and the delay in FET turn on time and FET turn off times. These again may be asymmetric in that one is faster than the other.

Returning to FIG. 4, we might expect that asserting "clkboost" would immediately cause S2 to conduct. However, real logic gates exhibit a signal propagation delay. Similar delays occur between "clkbuck" being asserted, thereby instructing switch S1 to be opened. Propagation delays in excess of 20 ns are typical.

Also, as shown in FIG. 4 it can be seen that the size of the offset produced by the offset generator 180 controls the difference between the values of Vea and Veap and hence the overlap range for which both controllers are active to create a buck-boost window. One suitable algorithm for controlling the overlap is disclosed in U.S. Ser. No. 12/001,700 which is incorporated herein by reference (and more specifically page 12 line 12 to page 19 line 18, and associated drawings) and which discloses a scheme for controlling the length of the transistor switching times when operating in the BUCK-BOOST regime, and indeed it also functions correctly outside of the BUCK-BOOST window.

U.S. Ser. No. 12/001,700 teaches that in order to compensate for the delays that can occur between asserting a control signal for a transistor to switch on or off, and the transistor actually switching on or off, then it is necessary to measure the times for which the transistors are actually conducting. This can be achieved simply by measuring the voltage at the node 4, so as to determine whether S1 is conducting, or at the node 8 so as to determine whether S2 is conducting. If S1 is not conducting and current flow in the inductor is from node 4 to node 8 which corresponds to the "Forward" flow. then the voltage at node 4 is either zero volts, when S3 is an active rectifier or −0.7 volts when a fly-back diode is used. However if the current flow in the inductor is in reverse (which could happen if the load current drops to a very low value or if the load has a reactive component) then the voltage at node 4 could rise above $V_{in}$, until such time as a normally reverse biased diode (not shown) in parallel with S1 starts conducting. Similarly the voltage at node 8 for forward current flow is either zero volts when S2 is conducting or $V_{out}$ when it is not. For reverse current flow conditions node 8 is at $V_{out}$ if S4 is conducting, zero volts if S2 is conducting or −0.7 V if S2 and S4 are briefly both off and the flyback diode around S2 switches on. Therefore the times for which the transistors are conducting and not conducting can be easily determined. We are generally interested in when switch S1 goes non-conducting, which is determined by the voltage at node 4 going low, and also the time for which S2 is conducting, which is shown by a voltage at node 8 going low.

The times for which the voltages should be low are known to the controller, and the time is for which the voltages actually go low can be compared to transition windows. The transition window is made up of two parts, which in FIG. 10 of U.S. Ser. No. 12/001,700 10 are designated by two distinct shadings. The first part of a transition window indicates a time mask which measures whether the duration for which the corresponding node is at the expected voltage is too short. The second time mask marks the time range in which a switching transition is expected to occur. To put this in context, consider a first pulse which corresponds to transistor S1 switching off. The first mask time is initiated at the time the switching signal is sent to the transistor S1 and results in a transition occurring at node 4. It then times out the first period and a check is made to see whether the transistor S1 has switched during that period, as represented by a further transition at node 4. The second period 202 is then commenced which indicates a period in which the transistor switching is expected. At the end of that period if a switching has not occurred, as shown by a change in voltage at node 4, then it is known that the pulse exceeds its desired duration. Steps can then be made to change the duration of the pulse. Based on these measurements the pulse width can be varied. Similar measurements are taken for the pulses at the second terminal of the inductor. The controller varies the individual pulse durations using a relatively simple control strategy in which:

i) For each one of the time periods, the durations of the pulses are measured.
ii) If both the pulses are too short (which includes one or other of them not existing at all) then the duration of the pulses are increased.
iii) If both pulses exist, but one of them exceeds the desired duration, then the duration of the pulses are decreased.

For all other conditions, such as both pulses the correct size, one pulse the correct size and the other too short or one pulse greater than the correct size and the other missing, then no alteration to the pulse lengths are made.

The pulse lengths can be varied by changing the value of ΔV generated by the voltage generator 202 or 180.

The technique works well.

As noted before, in practice a state machine is used to control the switches to make sure that S1 and S3 cannot be on at the same time. This does however give rise to a minimum duration below which the switch cannot transition. This duration set by the state machine or by the reaction time of the transistor switches is often in the range of 6 to 30 ns, and typically around 15 ns.

This means that if the control strategy seeks to reduce the switch on or off time below 15 ns, the switches will not respond more quickly and hence control is impaired. Under such circumstances the switching time of the complimentary pulse in the control strategy needs to be adjusted instead.

The time mask to detect the "too short" period needs to exceed the minimum switching period with a suitable margin of error. In practice this means that the first period corresponding to the pulse being too short needs to be at least 32 ns. If we then account for process and temperature variations this means that the mask time typically ranges between 32 and 50 ns. The other mask period is typically between 50 and 90 ns.

The duration of these windows limit the maximum switching frequency of the regulator. If, in use, the controller sees minimum switching durations of LX1 and LX2 of 80 ns (resulting from guard periods) or so then this is reasonable for a controller switching at 2.5 MHz (so 400 ns per cycle). However for a controller operating at 6 MHZ (so the control period has a cycle time of 160 ns) then this corresponds to the sum of the mask periods used as part of the control strategy and hence the by pass time for which the rapid current build is actually enabled would be almost zero, leading to poor efficiency and poor regulation.

The algorithm described in the earlier application works well, but the mechanism for determining in the pulses for fast charge (LX2=0, slope=+$V_{in}$/L, LX2=node 8) and fast discharge (LX1=0, slope=−$V_{out}$/L, LX1=node 4) are too long or too short can be improved for use at higher repetition rates.

An embodiment of the invention changes the way in which the too short, OK and too long times are calculated.

Firstly, rather that setting the "too short" time to start when a voltage transition occurs at node 4 or 8, as appropriate, instead the state machine is adapted to assert a signal when for example switch S2 has received a switch on signal at its gate and has started conducting, and this signal from the state machine, which can be regarded as a "switching confirmation signal" that is used to set the commencement of the "too short" mask period. The signal from the state machine may additionally or alternatively set the commencement of the "too long" mask period. This has an advantage in that the LX1 and LX2 signals (from nodes 4 and 8) no longer need to be measured, but instead every timing measurement can be derived from the control signals provided by the state machine.

As a consequence the "too short" mask period can be reduced in duration as it no longer has to include the various propagation delays from the time "clkbuck" is asserted to the time the switch can reasonably be expected to start conducting. Similarly the too long period no longer needs to include an uncertainty carried over from the guard periods inserted into the "too short" period. As a consequence the duration of the too short mask can be reduced to around 10 ns or so, and the too long mask can set up a few 10's of nanoseconds after the end of the too short mask has finished.

Figure 7:
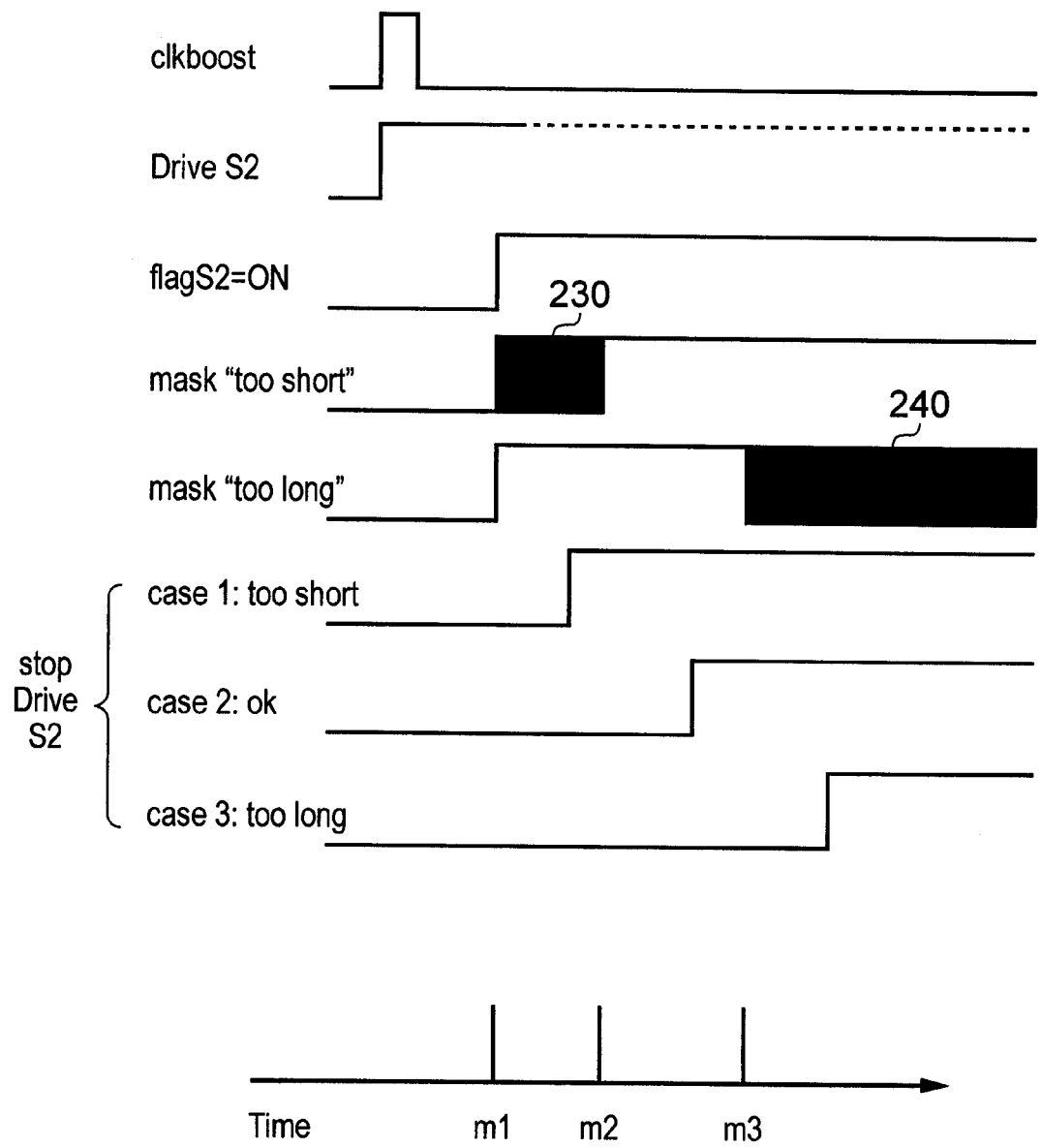
FIG. 7 is a timing diagram for measuring the duration of the switching pulse associated with the second switch S2.

FIG. 7 shows exemplary timing diagrams relating to the control of the second switch S2.

The clkboost signal sets the Set-reset latch and hence causes a signal to switch transistor S2 on to be asserted. The state machine that controls S2 and S4 sets up the necessary delays to avoid a short circuit and asserts a flag when S2 is on.

Concurrent with, or substantially concurrent with, setting of this flag, the "too short" mask is asserted and the "too long" mask timer is started. The "too short" mask can be considered as extending from time m1 to m2 as measured from the switching confirmation signal which here is "flag S2=ON". The too long mask extends from a time m3 after the switching confirmation signal, optionally to a limit time m4.

The stop signal, which acts as a control signal, is asserted by the comparator 134 (FIG. 4) when the voltage at its input reaches an appropriate level. We can see that there are broadly three cases to consider:
1) Too short: When the "stop" signal has its rising edge during the mask too short period 230, or even earlier, such as before the S2 on flag is set, then we know that the control algorithm is trying to switch the transistor off when hardly any ON time has elapsed. This gives rise to only a very small current ripple and hence very poor regulation.
2) Too long: When the stop signal has it rising edge long (in relative terms) after the S2 on flag was asserted and during the "too long" mask period 240 then this indicates that the controller has plenty of margin to reduce the duration of the ON state of S2. Too long an ON time may give rise to excessive switching losses.
3) Not too long or to short: Here the On time is within an acceptable range of values.

Figure 8:
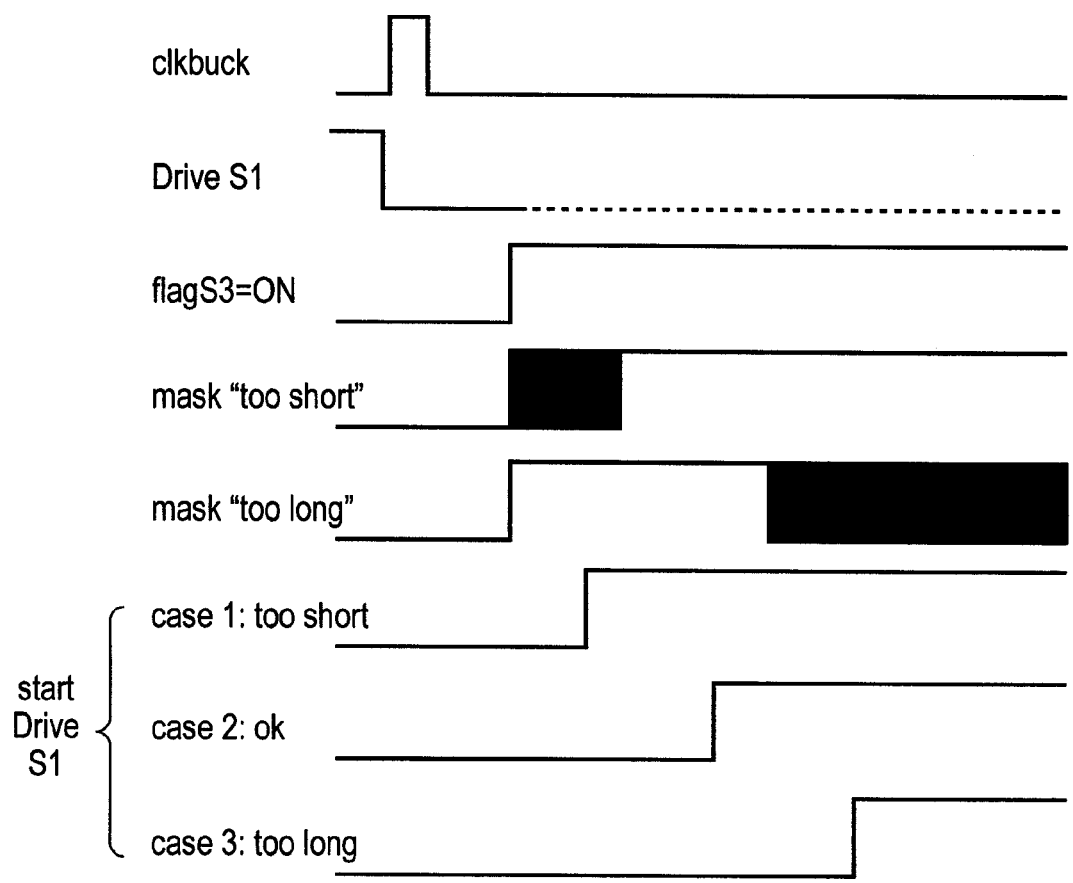
FIG. 8 is a timing diagram for measuring the duration of the switching pulse associated with the first switch 51.

A similar approach can be applied to S1, as shown in FIG. 8. Here, the clkbuck signal is applied to the reset input of the set-reset gate that is in the signal path to switch S1. Thus the clock launches a switch off sequence for S1. The state machine can either ser a flag when S1 is off, or as shown here, set a flag when S3 switches on. Setting of this flag initiates "too short" and "too long" masks. From here the operation is as described earlier.

Consequently the control strategy can be used in which:
1) For each one of the time periods, the durations of the pulses are measured.
2) If both the pulses are too short (which includes one or other of them not existing at all) then the duration of the pulses are increased.
3) If both pulses exist, but one of them exceeds the desired duration, then the duration of the pulses are decreased,
4) For all other conditions, such as both pulses the correct size, one pulse the correct size and the other too short or one pulse greater than the correct size and the other missing, then no alteration to the pulse lengths are made This regime allows the guard times used in U.S. Ser. No. 12/001,700 to be reduced and hence the controller can be used at higher switching speeds. The control algorithm described in that patent can be used, and the durations of the switching pulses can be adjusted by varying the offset voltage.

This revised control scheme can also be used in other switching controllers. By not having to include ground times because of propagation delays or measure the times a much faster response can be achieved, and the "too short" time can be reduced.

The apparatus for monitoring pulse times can be used with any BUCK-BOOST controller independent of whether the control loop implements voltage mode control or current mode control.

The invention claimed is:

1. An apparatus for monitoring the pulse time of one or more switches within a DC to DC power supply comprising:
a timing circuit responsive to a switching confirmation signal which indicates that a switch has reached a desired switching state, said timing circuit arranged to commence timing and to monitor for control signals being sent to the one or more switches and to indicate whether an elapsed period between the switching confirmation signal and the control signal is too long or too short,
said timing circuit arranged to generate a too short mask extending from a first time after receipt of the switching confirmation signal to a second time after receipt of the switching confirmation signal, said timing circuit further arranged such that the occurrence of the control signal between the first and second times give rise to an indication that the pulse time of an associated switch pulse time is too short, and
said timing circuit arranged to generate a too long mask extending from a third time measured from receipt of the switching confirmation signal, said timing circuit further arranged such that the failure of the control signal to occur before the third time gives rise to an indication that the associated switch pulse time is too long.

2. An apparatus as claimed in claim 1, in which the apparatus is arranged to measure a first pulse time for a first switch connected between an input of a DC to DC converter and a first node of an inductor of the DC to DC converter, and a second pulse time for a second switch connected between a second node of the inductor and a reference voltage or a common conductor.

3. An apparatus as claimed in claim 2, in which the reference voltage is ground.

4. An apparatus as claimed in claim 2, in which a too short period and a too long period are established for said first pulse time, and a too short period and a too long period are established for said second pulse time.

5. An apparatus as claimed in claim 4, further comprising a decision circuit arranged to cause the first and second pulse times to be altered such that if both the first and second pulse times are too short, then the durations of the first and second pulse times are increased.

6. An apparatus as claimed in claim 5, in which the decision circuit is further arranged to decrease the durations of the first and second pulse times if both pulses exist but one of them is too long.

7. A controller including an apparatus for monitoring pulse times as claimed in claim 5, wherein the controller includes first and second comparators or amplifiers in signal paths to the first and second switches, respectively, and the durations of the pulse times are adjustable by applying a offset in response to the decision circuit.

8. A DC to DC converter including a controller as claimed in claim 7.

9. A DC to DC converter as claimed in claim 8, the controller being operable in a BUCK-BOOST mode.

10. A controller including an apparatus for monitoring pulse time as claimed in claim 1.

11. An apparatus as claimed in claim 1, further comprising a state machine arranged to generate said switching confirmation signal.

12. A method of monitoring pulse times of switches within a DC to DC power supply, comprising:
a) monitoring for receipt of a switching confirmation signal which confirms that a switch has reached a desired switching state;
b) starting at least one timer in response to the switching confirmation signal;
c) monitoring for receipt of a control signal to revert the switch from the desired state;
d) comparing an elapsed time as measured by the timer with threshold values and indicating whether the time period from the switching confirmation signal to receipt of the control signal was too long or too short.

13. A method as claimed in claim 12, in which a duration of a first pulse time is measured for a first switch connected in a path between a voltage input of the DC to DC converter and a first node of an inductor therein, and a duration of a second pulse time is measured for a second switch connected in a path between a second node of the inductor and a local ground, and the first and second pulse durations are measured with respect to respective time periods to determine if the pulses are too long or too short.

14. A method of controlling a DC to DC converter, the method comprising measuring first and second pulse lengths as claimed in claim 13, and indicating that:
   e) the pulse lengths are to be increased if both the first and second pulse lengths are too short, and
   f) the pulse lengths are to be decreased if both pulses exist but one of them is too long.

* * * * *